US008382873B2

(12) United States Patent
Ono

(10) Patent No.: US 8,382,873 B2
(45) Date of Patent: *Feb. 26, 2013

(54) SAFETY CABINET

(75) Inventor: Keiichi Ono, Tainai (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/429,832

(22) Filed: Mar. 26, 2012

(65) Prior Publication Data

US 2012/0178354 A1 Jul. 12, 2012

Related U.S. Application Data

(63) Continuation of application No. 11/869,962, filed on Oct. 10, 2007, now Pat. No. 8,163,052.

(30) Foreign Application Priority Data

Dec. 20, 2006 (JP) ................................ 2006-342072

(51) Int. Cl.
*B01D 46/00* (2006.01)

(52) U.S. Cl. ................... 55/385.2; 55/DIG. 18; 454/56; 454/59

(58) Field of Classification Search ................. 55/385.2, 55/413, 467, 472, 473, 482, DIG. 18, DIG. 29, 55/DIG. 46; 454/187, 49, 56, 59, 184, 188, 454/189
See application file for complete search history.

(56) References Cited

U.S. PATENT DOCUMENTS

| | | | | |
|---|---|---|---|---|
| 3,397,631 | A | 8/1968 | Simons | |
| 4,927,438 | A | 5/1990 | Mears et al. | |
| 5,487,768 | A | 1/1996 | Zytka et al. | |
| 6,632,260 | B1 | 10/2003 | Siemers et al. | |
| 7,022,151 | B2 | 4/2006 | Ono | |
| 7,090,709 | B2 | 8/2006 | Ono | |
| 7,323,026 | B2 | 1/2008 | Ono | |
| 8,163,052 | B2 * | 4/2012 | Ono | 55/385.2 |

FOREIGN PATENT DOCUMENTS

| | | | |
|---|---|---|---|
| CN | 2608161 | Y | 3/2004 |
| JP | 61-145235 | U | 9/1986 |
| JP | 62-132550 | A | 6/1987 |
| JP | 63-1633 | U | 1/1988 |
| JP | 02-133430 | U | 11/1990 |
| JP | 02-138600 | U | 11/1990 |
| JP | 06-297356 | A | 10/1994 |
| JP | 08-313023 | A | 11/1996 |
| JP | 2001-129414 | A | 5/2001 |
| JP | 2005-066537 | A | 3/2005 |
| JP | 2005-218925 | A | 8/2005 |

OTHER PUBLICATIONS

Chinese Application No. 200710167430.2—First Office Action dated Jun. 5, 2009—English translation only.
Japanese Application No. 2006-342072—Office Action dated Aug. 30, 2011 with partial English translation.

* cited by examiner

*Primary Examiner* — Duane Smith
*Assistant Examiner* — Minh-Chau Pham
(74) *Attorney, Agent, or Firm* — Miles and Stockbridge P.C.

(57) ABSTRACT

A safety cabinet can adapt to variations in body height of a worker or user. The safety cabinet prevents various bacteria from proceeding from the outside of the safety cabinet into a working space of the safety cabinet and prevents bacteria or viruses from proceeding from the working space to the outside of the safety cabinet irrespective of a change in opening area of a front opening. A flow velocity of clean air supplied into the working space and a flow velocity of the air flowing through the front opening are set in accordance with a size of the front opening to maintain physical isolation and prevent contamination. The size of the front opening of the safety cabinet is adjustable.

2 Claims, 7 Drawing Sheets

SAFETY CABINET

CROSS-REFERENCE TO RELATED APPLICATIONS

This application is a continuation of application Ser. No. 11/869,962, filed Oct. 10, 2007, now U.S. Pat. No. 8,163,052. This application also claims priority from Japanese application JP2006-342072 filed on Dec. 20, 2006, the content of which is hereby incorporated by reference into this application.

BACKGROUND OF THE INVENTION

The present invention relates to a safety cabinet for biohazard, that is, a clean worktable enabling a hazard to be prevented from being caused by a treatment of microorganism or causal organism for genetic manipulation in medical or pharmaceutical field or an investigation of the causal organism for an investigation of infection disease.

In the prior art, a safety cabinet is used as a primary barrier for physically isolating a human body or an environment from the microorganism or causal organism to be treated. In a prior art safety cabinet, an opening area of a front opening is fixed as disclosed by JP-A-62-132550, and a flow rate through the front opening is measured by a flow rate sensor so that a blower is controlled to keep the flow rate within a predetermined range even when HEPA filter as a cleaner is in clogging to cause a change in pressure loss thereof.

In the prior art safety cabinet, the opening area of the front opening is fixed at a predetermined value such as 200 mm to keep the flow rate through the front opening at a constant degree as disclosed by Japanese Industrial Standards K3800: 2000. A worker extends his arm through the front opening into a working space to treat the microorganism or causal organism. Further, he looks into the working space through a front shutter above the front opening.

BRIEF SUMMARY OF THE INVENTION

In the prior art, there is a problem of that a movable range of a hand in the working space is limited by a fixed size of the front opening when the microorganism or causal organism is treated. Further, there is a weak point of that the treatment is difficult for the worker of low body height when the size of the front opening of the safety cabinet is 250-300 mm greater than normal size of 200 mm.

An object of the present invention is to provide a safety cabinet easily usable for any worker of various height.

To achieve the above object, according to the invention, in a safety cabinet comprising an air supply system including a blower and a first air cleaner through which the blower supplies a clean air into a working space, a front surface of the working space including a front shutter, a front opening communicating with the working space under the front shutter, a discharge system including a second air cleaner through which an air taken through the front opening into the safety cabinet is discharged from the safety cabinet, and a pressure chamber communicating with the first and second air cleaners and the blower, a flow rate of the air supplied into the working space and a flow rate of the air taken through the front opening into the safety cabinet are controlled in accordance with a size of the front opening.

Further, in the safety cabinet, the flow rate of the air supplied into the working space and the flow rate of the air taken through the front opening into the safety cabinet are controlled independent of each other in accordance with the size of the front opening.

Further, in the safety cabinet, a height of the front opening from a floor is adjustable in accordance with the body height of the worker.

Other objects, features and advantages of the invention will become apparent from the following description of the embodiments of the invention taken in conjunction with the accompanying drawings.

DETAILED DESCRIPTION OF THE INVENTION

Hereafter, embodiments of the invention will be described with making reference to FIGS. 1-7.

(Embodiment 1)

Figure 1:
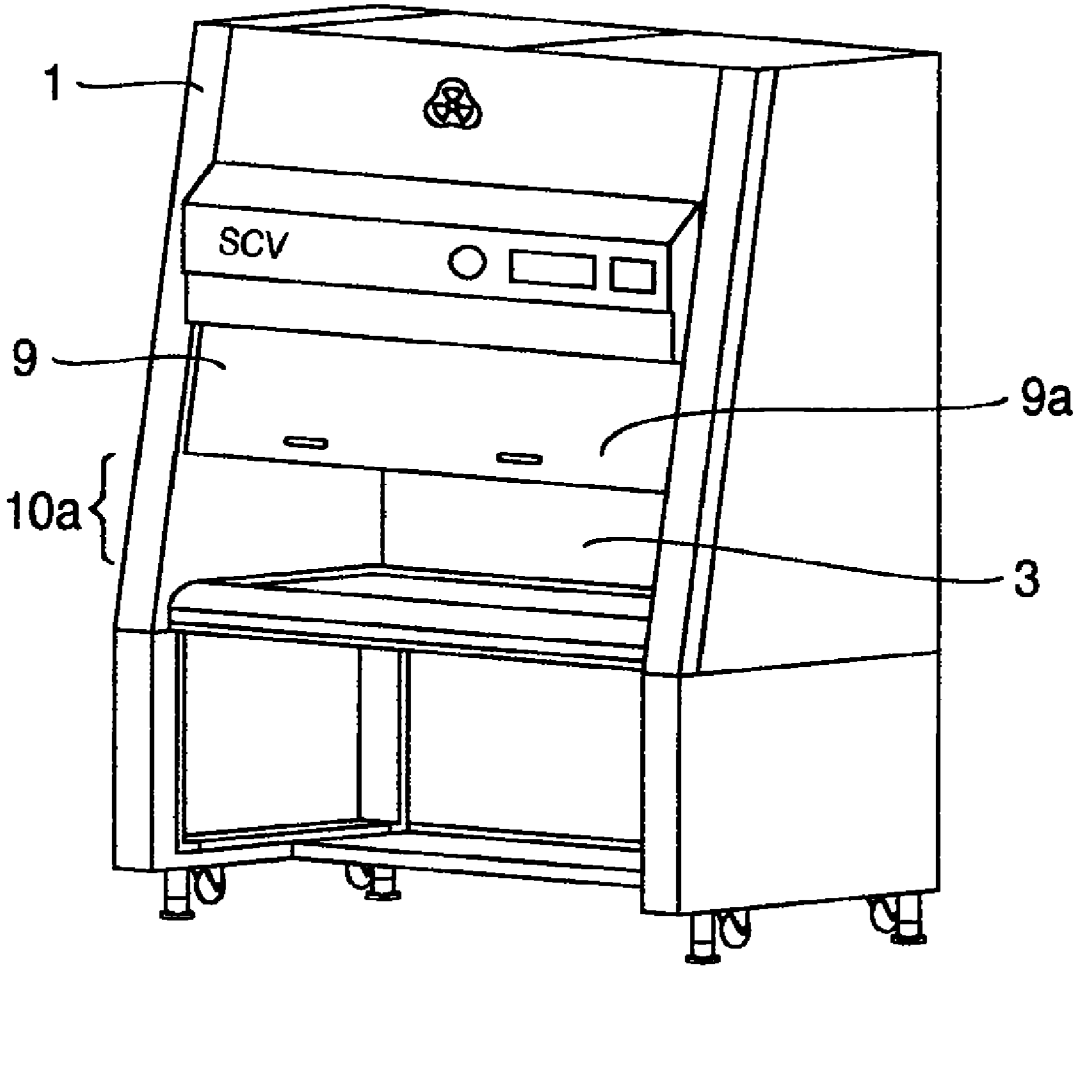
FIG. 1 is a schematic oblique projection view showing a safety cabinet as a first embodiment of the invention.

FIG. 1 is a schematic oblique projection view showing a safety cabinet as a first embodiment of the invention.

A worker extends his or her arm into a safety cabinet 1 through a front opening 10, and looks into a working space 3 through a front surface shutter 9 to treat bacteria or virus.

Figure 2A:
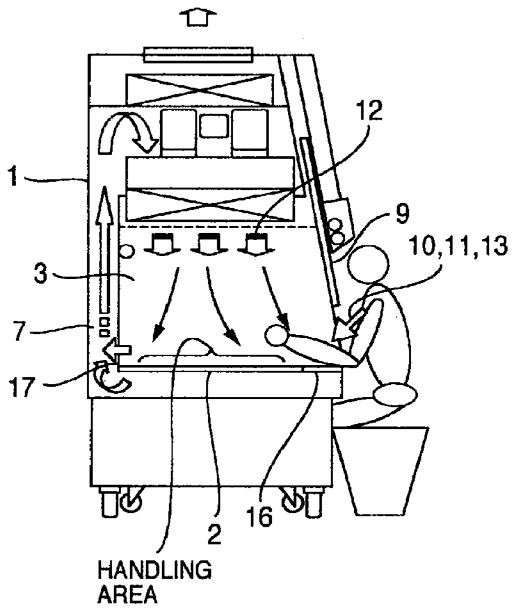
FIG. 2A is a partially cross sectional view showing the safety cabinet as the first embodiment of the invention.
Figure 2B:
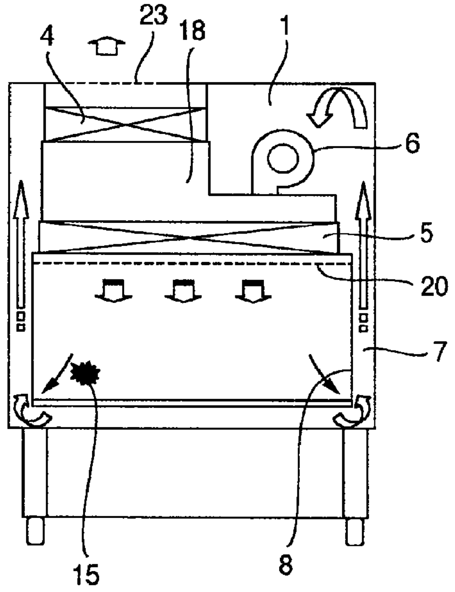
FIG. 2B is another partially cross sectional view showing the safety cabinet as the first embodiment of the invention.

FIG. 2A is a partially cross sectional view showing the safety cabinet as the first embodiment of the invention. FIG. 2B is another partially cross sectional view showing the safety cabinet as the first embodiment of the invention.

A clean air is supplied from a HEPA filter 5 into the working space 3 of the safety cabinet 1 through a straightening vane 20.

An air 13 taken through the front opening into the safety cabinet flows to a blower 6 through a circulating path extending under a working table 2 and a back side of the working space 3. The air taken into the blower 6 is pressurized in a pressure chamber 18. The pressure chamber 18 communicates with a HEPA filter 4 for the air to be discharged air and the HEPA filter 5 for the air to be supplied so that the air which was taken through the front opening and from which the bacteria and virus were filtered out by the HEPA filter 4 to convert the air to a clean air is discharged from an exhaust port 23. The other part of the air not discharged from the exhaust port 23 passes the HEPA filter 5 to be supplied as the clean air into the working space 3. The air 12 supplied into the working space 12 is the clean air prevented from including the bacteria and virus 15 so that the bacteria and virus 15 treated in the working space 3 is protected and prevented from being contaminated by the other various bacteria or virus 15.

A working table 2 has a front intake slit 16 adjacent to the front opening 10. The air is taken into the front intake slit 16 from the working space 2 and the outside of the cabinet to form an air curtain for preventing contaminant from moving between the working space 3 and the outside of the safety cabinet 1. The air flow 12 supplied into the working space 3 and the air flow 13 from the front opening 10 protect the bacteria or virus 15 treated in the working space 3 from the bacteria or virus existing in the outside of the safety cabinet 1 and prevent the bacteria or virus 15 treated in the working space 3 from moving out of the working space so that the worker is prevented from being infected with the bacteria or virus.

It is important for protecting a specimen from the bacteria or virus existing in the outside of the safety cabinet and preventing the worker from being infected with the bacteria or virus that an air velocity 12*a* into the working space 3 and an air velocity 13*a* taken from the front opening are respective predetermined velocities. When the air velocity 13*a* is too low, there is a provability of that the bacteria or virus 15 flows from the working space 3 with the air flow 12 through the front opening 10 to the outside of the safety cabinet. In the prior art safety cabinet, a flow rate of a blower is constant. Therefore, in the prior art safety cabinet, the air velocity 13*a* taken from the front opening 10 decreases in accordance with an increase of an area of the front opening 10, whereby the worker uses the cabinet while keeping the area of the front opening 10 constant.

Figure 8A:
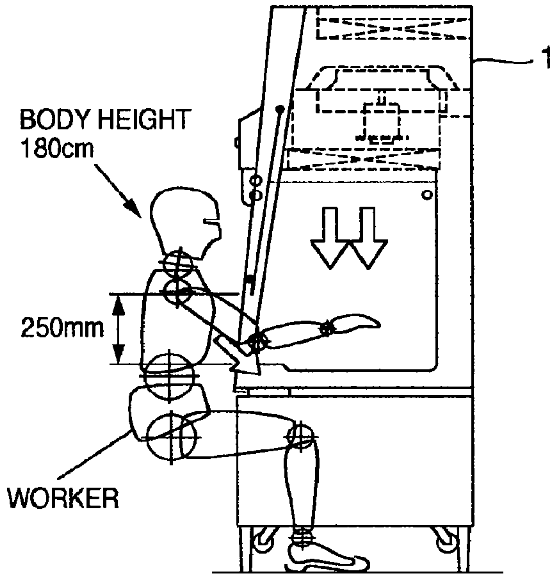
FIG. 8A is a partially cross sectional view showing a relationship between a body height of a worker and a safety cabinet of the invention.
Figure 8B:
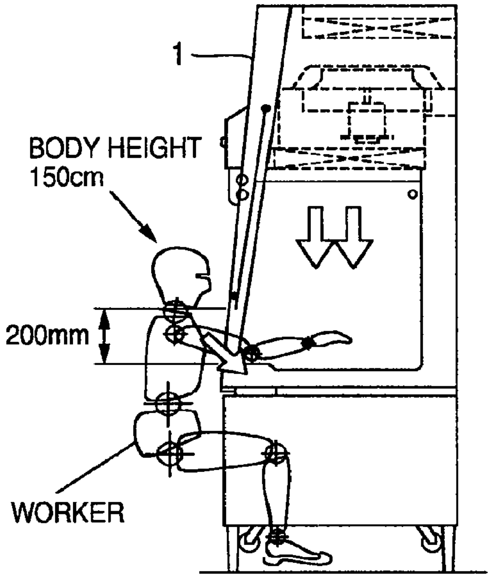
FIG. 8B is another partially cross sectional view showing another relationship between the body height of the worker and the safety cabinet of the invention.
Figure 8C:
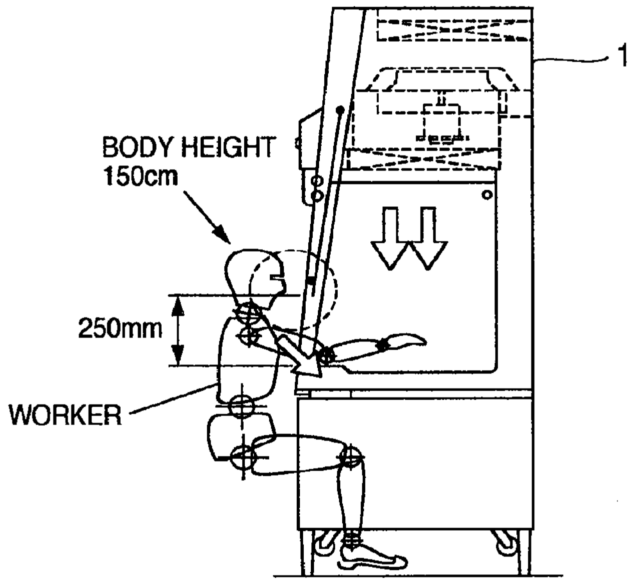
FIG. 8C is another partially cross sectional view showing another relationship between the body height of the worker and the safety cabinet of the invention.

FIGS. 8A-8C show situations where the worker uses the safety cabinet.

When the front opening 10 is narrow, a movable range of an arm of the worker extending through the front opening is narrow for easy operation, whereby the front opening 10 is required to have a great size in a vertical direction in which a hand is moved. When the size of the front opening 10 is great, a flow rate through the front opening is increased by increasing a flow rate discharged through the discharging HEPA filter 4 to keep the intake flow rate 13*a* sufficient for preventing the bacteria or virus 15 from moving from the working space 3 to the outside of the safety cabinet 1. On the other hand, when the worker using the safety cabinet 1 in which the vertical size of the front opening 10 is great has a low body height, his or her visual line into the working space 3 overlaps an lower end of the front surface shutter 9*a* to cause a difficulty for looking onto the working table 2.

As shown in FIG. 8A, when the worker has the low body height, his or her difficulty for the operation is decreased by closing the front surface shutter to decrease the size of the front opening 10, but, since the area of the opening is decreased while keeping the flow rate constant so that the taken flow rate 13 becomes too high, there is a provability of that the various bacteria proceeds from the outside of the safety cabinet 1 over the front slit 16 into the working space 3 to contaminate the specimen in the working space 3. Therefore, in the safety cabinet, the taken flow rate needs to be kept at a predetermined value for keeping a performance.

Figure 3:
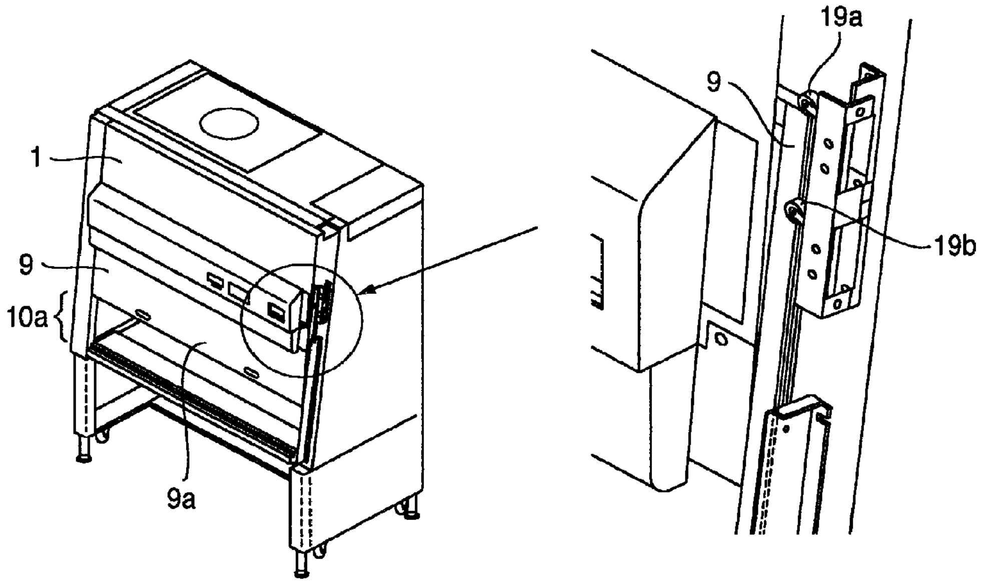
FIG. 3 is an oblique projection view including an enlarged view of a part of the safety cabinet, showing a sensor for measuring a size of a front opening in the safety cabinet as the first embodiment of the invention.

FIG. 3 is an oblique projection view including an enlarged view of a part of the safety cabinet, showing a sensor for measuring the size of the front opening in the safety cabinet as the first embodiment of the invention.

The front surface shutter 9 is moved vertically to change the vertical size of the front opening 10. In this embodiment, a limit switch is arranged to be horizontally juxtaposed with the front surface shutter 9 so that a flow rate of the blower is controlled to make the taken flow rate 13*a* at the predetermined value corresponding to the size 10*a* of the front opening. An example of control for a change of the size of the front opening from 250 mm to 200 mm is shown table 1.

TABLE 1

| | | |
|---|---|---|
| Front opening size 10a | 250 mm | 200 mm |
| Supply air velocity 12a | 0.35 m/s | 0.28 m/s |
| Supply air flow rate | 16.4 $m^3$/min | 13.1 $m^3$/min |
| Taken air velocity 13a | 0.55 m/s | 0.55 m/s |
| Taken air flow rate | 10.7 $m^3$/min | 8.6 $m^3$/min |
| Circling air rate | 60.5% | 60.5% |
| Total flow rate by fan | 27.1 $m^3$/min | 21.7 $m^3$/min |

Width of working space is 1300 mm, and depth thereof is 600 mm.

When a width of the working space is 1300 mm, a depth of thereof is 600 mm, the size of the front opening is 250 mm while the average supply air velocity 13*a* is 0.55 m/s to satisfy the performance of the air curtain, for obtaining the performance of the safety cabinet, the flow rate taken from the front opening=the flow rate discharged from the exhaust port 23 is 10.7 $m^3$/min. Further, when the supply air velocity 12*a* into the working space 3 is 0.35 m/s, the supply flow rate is 16.4 $m^3$/min. In this situation, a total flow rate of the blower is 10.7 $m^3$/min+16.4 $m^3$/min=27.1 $m^3$/min. In the safety cabinet, the flow rate supplied into the working space 3 is applied to the pressure chamber to be supplied again to the working space 3 so that the flow rate circulates. A rate of such circulating flow rate with respect to the total flow rate of the blower is called as a circulating air rate, and the circulating air rate is an important factor of the safety cabinet. In other words, the circulating air rate is a ratio between the flow rate passing through the HEPA discharge filter 4 and the flow rate passing through the HEPA supply filter 5. In the table 1, the circulating air rate is 60.5% when the size of the front opening is 250 mm. FIG. 3 shows a situation where the size 10*a* of the front opening is 250 mm. As shown in FIG. 3, a lower limit switch 19*b* is of ON condition and an upper limit switch 19*a* is of ON condition so that the size of the front opening is deemed to be 250 mm.

When the front surface shutter 9 is moved vertically downward in the same safety cabinet so that the size of the front opening becomes 200 mm, the upper limit switch 19*a* is of OFF condition and only the lower limit switch 19*b* is of ON condition so that the size of the front opening is deemed to be 200 mm. As a matter of course, stoppers are arranged at a position for setting the size of the front opening at 250 mm and a position for setting the size of the front opening at 200 mm respectively so that the front surface shutter is prevented from moving undesirably. As shown in 1, when the limit switch 19 detects that the size of the front opening is 200 mm, the flow rate of the blower 6 is decreased to 21.7 $m^3$/min. Since the circulating air rate in the safety cabinet 1 as shown in FIG. 2 is not changed, the taken flow rate through the front opening 10 and the supply flow rate into the working space 3 are decreased to 8.6 $m^3$/min and 13.1 $m^3$/min respectively to correspond to the decrease of the flow rate of the blower 6.

As a matter of course, the flowing in air velocity 13*a* becomes 0.55 m/s and the supply air velocity 12*a* becomes 0.28 m/s. When the above control is not performed although the size 10*a* of the front opening is 200 mm, the taken flow rate through the front opening 10 is kept at 10.7 $m^3$/min to increase the flowing in air velocity 13*a* to 0.68 m/s so that there is a provability of that the various bacteria proceeds from the outside into the working space 3.

The above control is an example, so there may be a case where when the size 10*a* of the front opening is 200 mm, the flowing in air velocity 13*a* is set at 0.57 m/s, because the desired performance is not obtained by keeping the flowing in air velocity 13*a* at 0.55 m/s On the other hand, in such case, the flow rate of the blower 6 may be set at a predetermined degree in accordance with the size 10*a* of the front opening detected by the limit switch 19 so that a predetermined flow rate for preventing a contamination of the safety cabinet 1 is obtainable.

Accordingly, the contamination of the safety cabinet 1 can be prevented even when the size 10*a* of the front opening is changed in accordance with the body height, the visual axis onto the working table 2 and the extension of the arm of the worker of the safety cabinet 1.

(Embodiment 2)

Figure 4A:
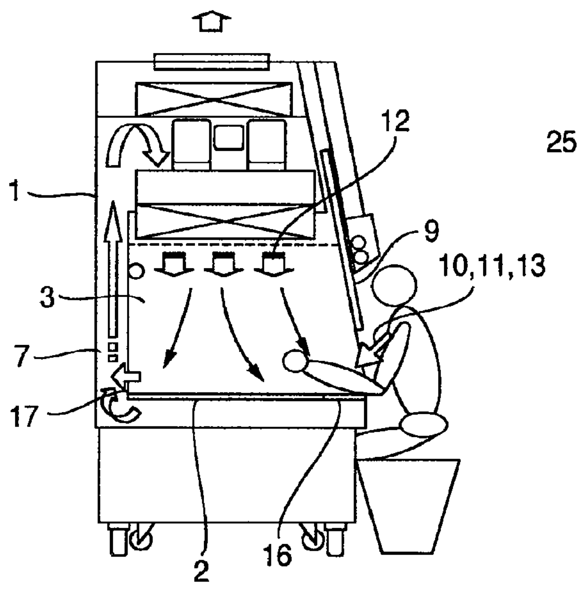
FIG. 4A is a partially cross sectional view showing the safety cabinet as a second embodiment of the invention.
Figure 4B:
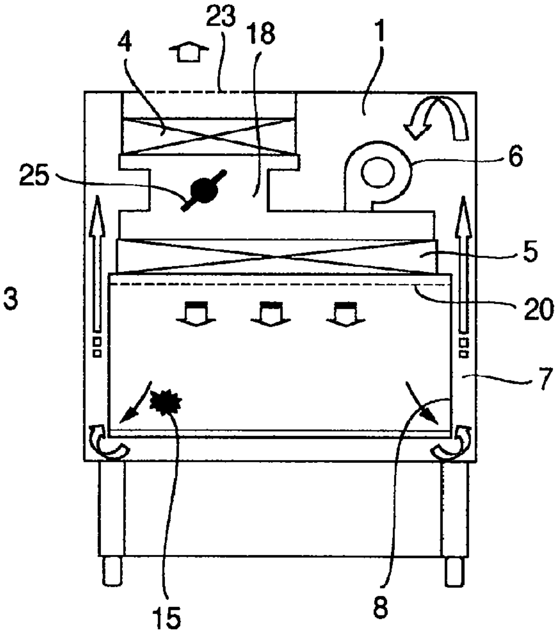
FIG. 4B is another partially cross sectional view showing the safety cabinet as the second embodiment of the invention.

FIG. 4A is a partially cross sectional view showing the safety cabinet as a second embodiment of the invention, and FIG. 4B is another partially cross sectional view showing the safety cabinet as the second embodiment of the invention while FIG. 1 shows the schematic view of the safety cabinet 1.

A damper 25 is arranged in a pressure chamber 18. The air output from the blower 6 is pressurized in the pressure chamber 18. The HEPA filter 4 for discharging the air and the HEPA filter 5 for supplying the air communicate with the pressure chamber 18 so that the air is distributed between a exhaust port 23 and the working space 3. The damper 25 is arranged in the pressure chamber 18 to adjust the air toward the HEPA filter 4 for discharging the air. When the damper 25 is opened, a flow rate toward the HEPA filter 4 is increased, and when the damper 25 is closed a flow rate toward the HEPA filter 5 for supplying the air is increased. In accordance with the size 10*a* of the front opening, not only controlling the output flow rate of the blower 6 but also moving the damper 25, so that the air velocity 13*a* taken from the front opening and the circulating air rate of the air velocity 12*a* into the working space 3 are controlled.

Table 2 shows an example of such control.

TABLE 2

| | | |
|---|---|---|
| Front opening size 10a | 250 mm | 200 mm |
| Supply air velocity 12a | 0.35 m/s | 0.35 m/s |
| Supply air flow rate | 16.4 $m^3$/min | 16.4 $m^3$/min |
| Taken air velocity 13a | 0.55 m/s | 0.55 m/s |
| Taken air flow rate | 10.7 $m^3$/min | 8.6 $m^3$/min |
| Circling air rate | 60.5% | 65.6% |
| Total flow rate by fan | 27.1 $m^3$/min | 25.0 $m^3$/min |

Width of working space is 1300 mm, and depth thereof is 600 mm.

The size of the working space 3 includes the width of 1300 mm and the depth of 600 mm similarly to table 1. The desired performance of the safety cabinet is obtainable when the size 10*a* of the front opening is 250 mm, the air velocity 13*a* taken from the front opening=0.55 m/s, and the air velocity 12*a* into the working space 3=0.35 m/s. When the size 10*a* of the front opening is 200 mm and the output flow rate of the blower 6 is decreased with keeping the circulating air rate constant, the air velocity 12*a* into the working space 3 is decreased to increase a provability of that the various bacteria proceeds from the outside into the working space 3 with the air velocity 13*a* taken from the front opening when the safety cabinet 1 has a certain shape. In such case, the air velocity 12*a* into the working space 3 needs to be increased. In the table 2, when the size 10*a* of the front opening is set at 200 mm in accordance with the position of the front surface shutter, the damper 25 is closed to restrict the air flow toward the HEPA filter 4 for discharging the air so that the taken flow rate through the front opening 10 is decreased to 8.6 $m^3$/min while the circulating air rate is changed from 60.5% to 65.6% so that the air velocity 12*a* into the working space 3 is kept at 0.35 m/s to obtain the contamination preventing performance for the safety cabinet 1.

Table 3 shows an example as a substitute for the control of the safety cabinet 1 shown in the table 2.

TABLE 3

| | | |
|---|---|---|
| Front opening size 10a | 250 mm | 200 mm |
| Supply air velocity 12a | 0.35 m/s | 0.37 m/s |
| Supply air flow rate | 16.4 $m^3$/min | 17.3 $m^3$/min |
| Taken air velocity 13a | 0.55 m/s | 0.69 m/s |
| Taken air flow rate | 10.7 $m^3$/min | 10.7 $m^3$/min |
| Circling air rate | 60.5% | 61.8% |
| Total flow rate by fan | 27.1 $m^3$/min | 28.0 $m^3$/min |

Width of working space is 1300 mm, and depth thereof is 600 mm.

In the safety cabinet, the air discharged from the exhaust port 23 may be discharged outbye (not necessarily) through a duct of a room in which the safety cabinet is arranged. In such situation, the duct has a fan for discharging the air, and in many cases, a flow rate of the fan for discharging the air from the safety cabinet 1 is not controlled in accordance with a change of the size 10*a* of the front opening. If so, the flow rate of the fan for discharging the air from the safety cabinet 1 needs to be made constant. In such case, when the size 10*a* of the front opening is changed from 250 mm to 200 mm, since the discharged flow rate=the taken in flow rate, the taken in air flow velocity 13*a* changes from 0.55 m/s to 0.69 m/s excessively higher than the supply air velocity 12*a* into the working space 3. In such case, by increasing the total flow rate by the blower from 27.1 $m^3$/min to 28.0 $m^3$/min to change the circulating flow rate from 60.5% to 61.8% to keep the supply air velocity 12*a* sufficient, the supply air velocity 12*a* into the working space 3 is kept at 0.37 m/s to prevent the various bacteria from proceeding from the outside into the working space 3 while keeping the discharged flow rate=the taken in flow rate.

The air velocity necessary for preventing the contamination changes in accordance with the shape of the safety cabinet. A value thereof is predetermined so that the flow rate of the blower 6 and a driven angle of the damper 25 are predetermined.

(Embodiment 3)

Figure 5A:
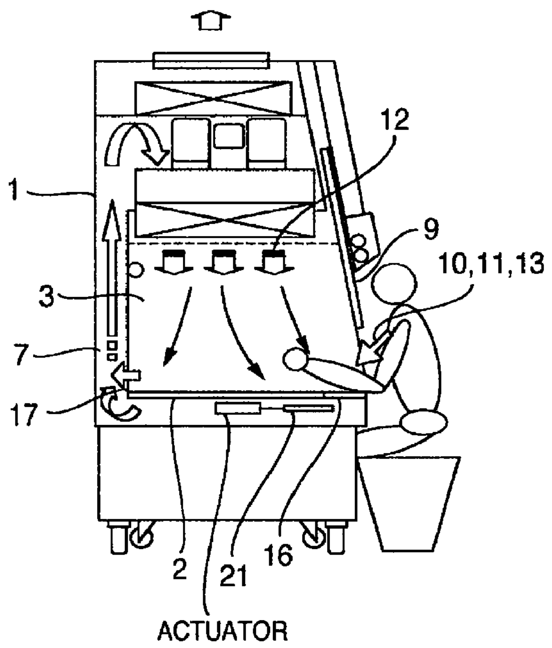
FIG. 5A is a partially cross sectional view showing the safety cabinet as a third embodiment of the invention.
Figure 5B:
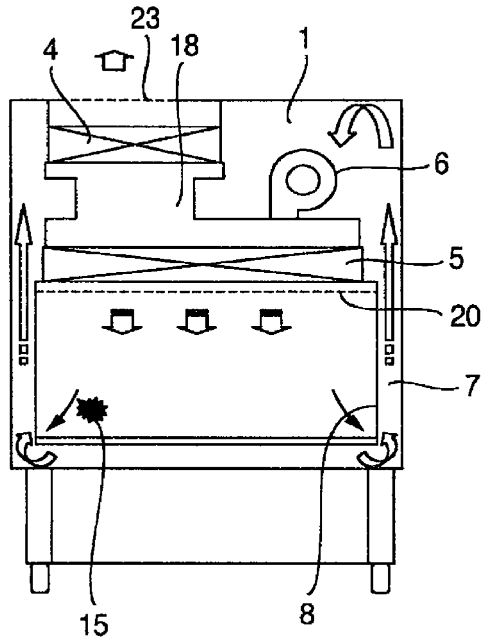
FIG. 5B is another partially cross sectional view showing the safety cabinet as the third embodiment of the invention.

FIG. 5A is a partially cross sectional view showing the safety cabinet as a second embodiment of the invention, and FIG. 5B is another partially cross sectional view showing the safety cabinet as the second embodiment of the invention while FIG. 1 shows the schematic view of the safety cabinet 1.

An intake slit damper 21 to be driven by an actuator for changing an opening area of the front intake slit 16 is arranged. By opening the intake slit damper 21, a flow rate of the air taken into the front opening 10=a flow rate of the air discharged from the exhaust port 23 is increased, and by closing the intake slit damper 21, the flow rate of the air taken into the front opening 10 is decreased. In such structure, the flow rate of the air taken into the front opening 10 is controlled in accordance with ON/OFF signal of the limit switch 19 for detecting the position of the front surface shutter 9.

Table 4 shows an example of control in the third embodiment.

TABLE 4

| | | |
|---|---|---|
| Front opening size 10a | 250 mm | 200 mm |
| Supply air velocity 12a | 0.35 m/s | 0.35 m/s |
| Supply air flow rate | 16.4 $m^3$/min | 16.4 $m^3$/min |
| Taken air velocity 13a | 0.55 m/s | 0.55 m/s |
| Taken air flow rate | 10.7 $m^3$/min | 8.6 $m^3$/min |
| Circling air rate | 60.5% | 65.6% |
| Total flow rate by fan | 27.1 $m^3$/min | 25.0 $m^3$/min |

Width of working space is 1300 mm, and depth thereof is 600 mm.

The size of the working space 3 to be controlled is equal to those of the embodiments 1 and 2. When the size of the front opening is 250 mm, the intake slit damper 21 is opened. When receiving a signal of the limit switch 19 indicating that the size of the front opening is decreased to 200 mm, the flow rate of the blower 6 is decreased from 27.1 $m^3$/min to 25.0 $m^3$/min to change the circulating flow rate from 60.5 to 65.6%, so that the air velocity 12*a* into the working space 3 and the air velocity 13*a* taken from the front opening are set at respective predetermined values sufficient for preventing the contamination of the safety cabinet.

(Embodiment 4)

Figure 6A:
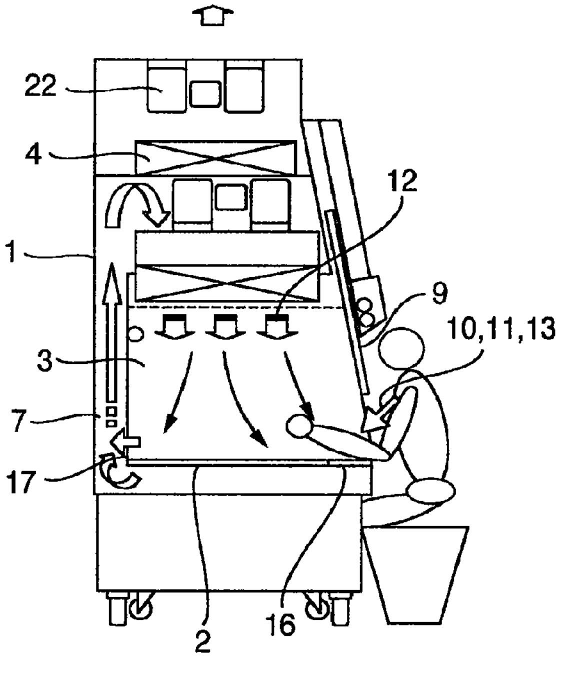
FIG. 6A is a partially cross sectional view showing the safety cabinet as a fourth embodiment of the invention.
Figure 6B:
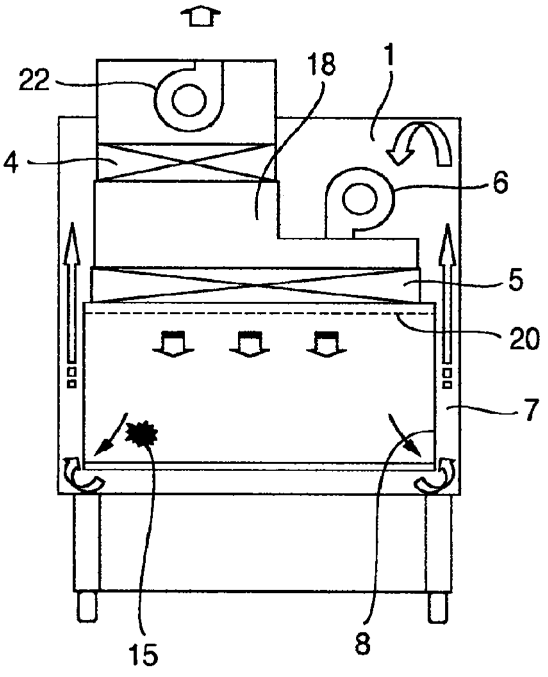
FIG. 6B is another partially cross sectional view showing the safety cabinet as the fourth embodiment of the invention.

FIG. 6A is a partially cross sectional view showing the safety cabinet as a fourth embodiment of the invention, and FIG. 6B is another partially cross sectional view showing the safety cabinet as the fourth embodiment of the invention.

An exhaust fan 22 is arranged at a downstream side of the HEPA filter 4 for the air to be discharged. By controlling the exhaust fan 22 between ON/OFF conditions in accordance with an operating condition of the safety cabinet 1, a distribution ratio of the air pressurized in the pressure chamber 18 between the HEPA filter 4 for the air to be discharged and the HEPA filter 5 for the air to be supplied is adjusted. When the exhaust fan 22 is driven, a flow rate of the air to be discharged to the HEPA filter 4 for the air to be discharged is increased, because it causes a decrease in pressure at the HEPA filter 4 for the air to be discharged so that the air is directed toward the HEPA filter 4 for the air to be discharged. An example of control in accordance with the position of the front surface shutter 9 detected by the limit switch 19 will be described below. When the size 10*a* of the front opening is 200 mm under normal operation, the exhaust fan 22 is kept stationary. When the front surface shutter 9 is moved upward and the limit switch 19 detects that the size of the front opening becomes 250 mm, the exhaust fan 22 is driven so that the discharged flow rate=the taken in flow rate increases to keep the air velocity 13*a* taken from the front opening at the predetermined value.

As described above, in the embodiments 1-4, the size of the front opening is set at selected one of 200 mm and 250 mm, but the size of the front opening may be set at 300 mm or at any size between 200 mm and 300 mm in a stepless manner. If being set in the stepless manner, the position of the front surface shutter 9 is converted to corresponding stepless signal of electric resistance, voltage, current or the like so that a rotational speed of the fan of the blower 6 is controlled in accordance with the position of the front surface shutter 9 in the stepless manner to adjust the flow rate thereof in the stepless manner. Further, by a plurality of the limit switches 19, multistages control is obtainable.

(Embodiment 5)

Figure 7A:
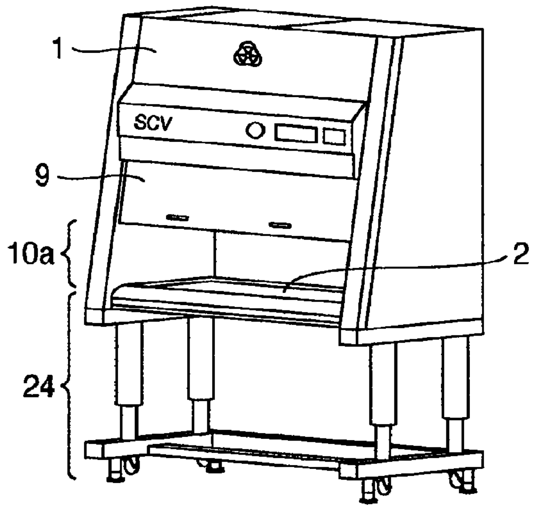
FIG. 7A is a schematic oblique projection view showing a safety cabinet as a fifth embodiment of the invention.
Figure 7B:
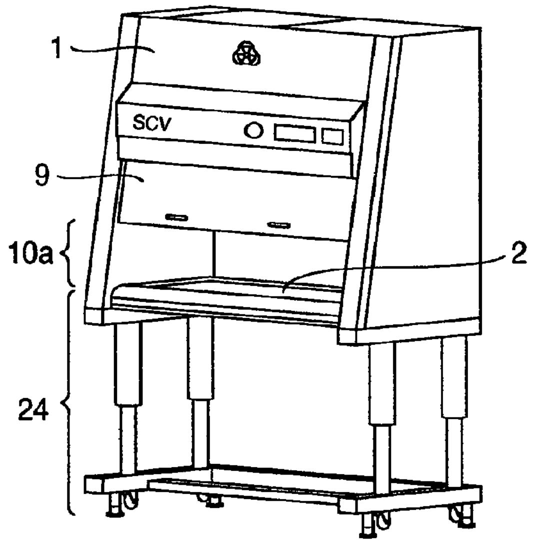
FIG. 7B is another schematic oblique projection view showing the safety cabinet as the fifth embodiment of the invention.

FIG. 7A is a schematic oblique projection view showing a safety cabinet as a fifth embodiment of the invention, and FIG. 7B is another schematic oblique projection view showing the safety cabinet as the fifth embodiment of the invention.

A height of the working table 2 (working table height 24) may be adjustable in accordance with the control of the blower 6 and/or the circulating air rate in accordance with the size 10*a* of the front opening as described in the embodiments 1-4. Whereby, the safety cabinet 1 by which the bacteria or virus 15 in the working space 3 is protected from the various bacteria of the outside and the infection of the worker is prevented is provided irrespective of the change of the size 10*a* of the front opening and the change of the height of the working table 2 in accordance with the body height, visual axis and arm movement of the worker using the safety cabinet 1.

According to the invention, a user friendly safety cabinet which can be used with the size of the front opening preferable for any body height of the worker is provided.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A safety cabinet comprising, an air supply system including a blower and a first air cleaner through which the blower supplies a clean air into a working space, a front surface of the working space including a front shutter, a front opening communicating with the working space to enable an arm of a worker to be inserted into the working space, and a discharge system including a second air cleaner through which air taken through the front opening into the safety cabinet is discharged from the safety cabinet by the blower, wherein in response to bringing down the front shutter to change a size of the front opening from a first size to a second size so that a flow rate of the air supplied from the front opening into the working space is changed from a first flow rate to a second flow rate, the flow rate of the air supplied from the front opening into the working space is decreased by the blower from the second flow rate toward the first flow rate as a predetermined value.

2. The safety cabinet according to claim 1, wherein a height of the front opening from a floor is adjustable in accordance with a body height of the worker.

* * * * *